(12) United States Patent
Aarrestad et al.

(10) Patent No.: US 9,307,200 B2
(45) Date of Patent: Apr. 5, 2016

(54) USE OF FACE AND MOTION DETECTION FOR BEST VIEW FRAMING IN VIDEO CONFERENCE ENDPOINT

(71) Applicant: Cisco Technology, Inc., San Jose, CA (US)

(72) Inventors: Glenn Robert Grimsrud Aarrestad, Høvik (NO); Rune Øistein Aas, Eidsvoll (NO); Kristian Tangeland, Oslo (NO)

(73) Assignee: Cisco Technology, Inc., San Jose, CA (US)

( * ) Notice: Subject to any disclaimer, the term of this patent is extended or adjusted under 35 U.S.C. 154(b) by 33 days.

(21) Appl. No.: 14/249,443

(22) Filed: Apr. 10, 2014

(65) Prior Publication Data

US 2015/0296178 A1   Oct. 15, 2015

(51) Int. Cl.
*H04N 7/15* (2006.01)
*G06K 9/00* (2006.01)
*H04N 5/232* (2006.01)

(52) U.S. Cl.
CPC .............. *H04N 7/15* (2013.01); *G06K 9/00255* (2013.01); *H04N 5/23219* (2013.01)

(58) Field of Classification Search
CPC ..... H04N 5/23219; H04N 7/15; H04N 5/232; H04N 7/14; H04N 7/142
USPC ............................................ 348/14.01–14.16
See application file for complete search history.

(56) References Cited

U.S. PATENT DOCUMENTS

| | | | |
|---|---|---|---|
| 8,169,463 B2 | 5/2012 | Enstad et al. | |
| 8,842,161 B2* | 9/2014 | Feng et al. | 348/14.12 |
| 2009/0015658 A1 | 1/2009 | Enstad et al. | |
| 2009/0256901 A1* | 10/2009 | Mauchly | H04N 5/45 348/14.07 |
| 2010/0238262 A1 | 9/2010 | Kurtz et al. | |
| 2014/0049595 A1 | 2/2014 | Feng et al. | |

OTHER PUBLICATIONS

International Search Report and Written Opinion in counterpart International Application No. PCT/US2015/024599, mailed Jul. 2, 2015, 10 pages.

* cited by examiner

*Primary Examiner* — Melur Ramakrishnaiah
(74) *Attorney, Agent, or Firm* — Edell, Shapiro & Finnan, LLC

(57) ABSTRACT

A video conference endpoint detects faces at associated face positions in video frames capturing a scene. The endpoint frames the video frames to a view of the scene encompassing all of the detected faces. The endpoint detects that a previously detected face is no longer detected. In response, a timeout period is started and independently of detecting faces, motion is detected across the view. It is determined if any detected motion (i) coincides with the face position of the previously detected face that is no longer detected, and (ii) occurs before the timeout period expires. If conditions (i) and (ii) are met, the endpoint restarts the timeout period and repeats the independently detecting motion and the determining. Otherwise, the endpoint reframes the view to encompass the remaining detected faces.

23 Claims, 6 Drawing Sheets

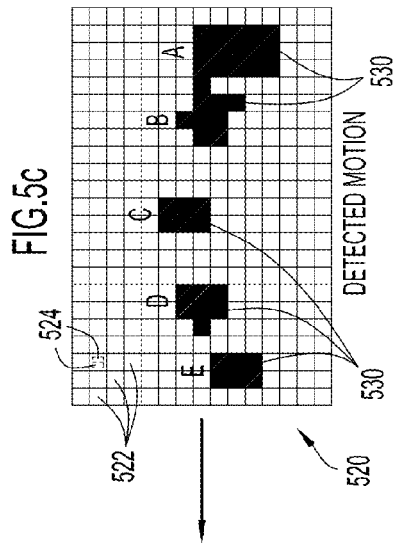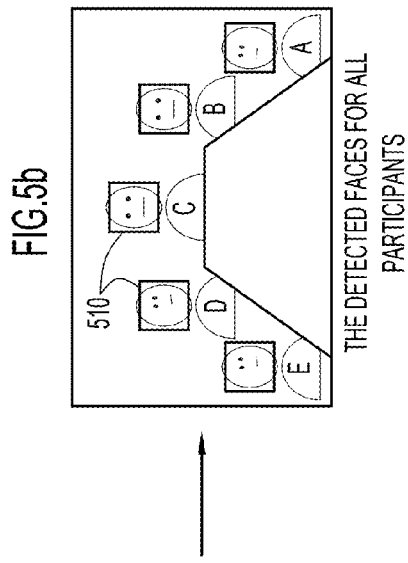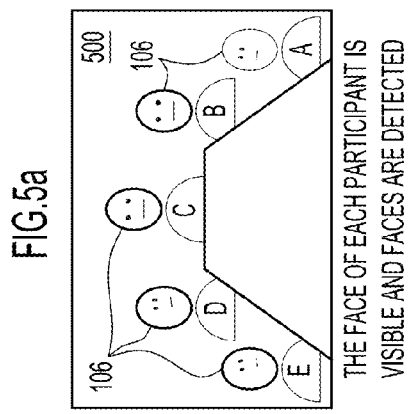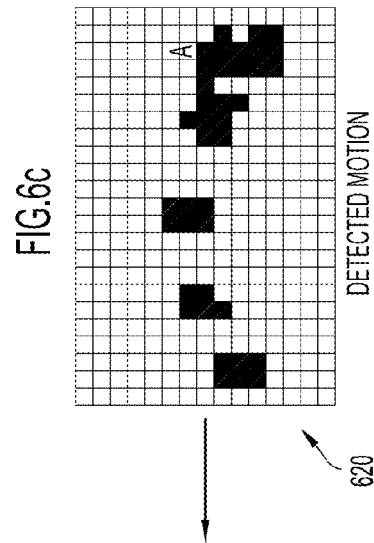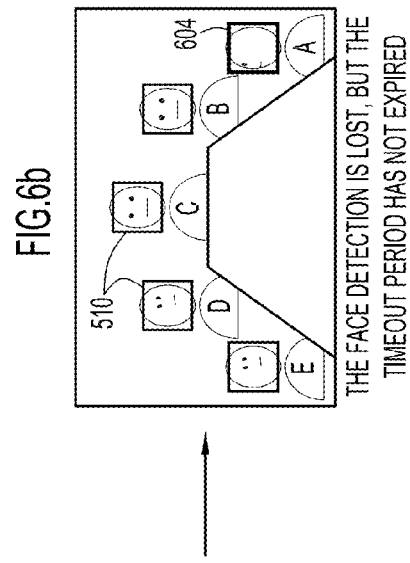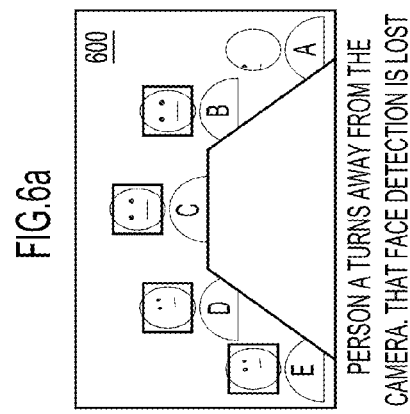

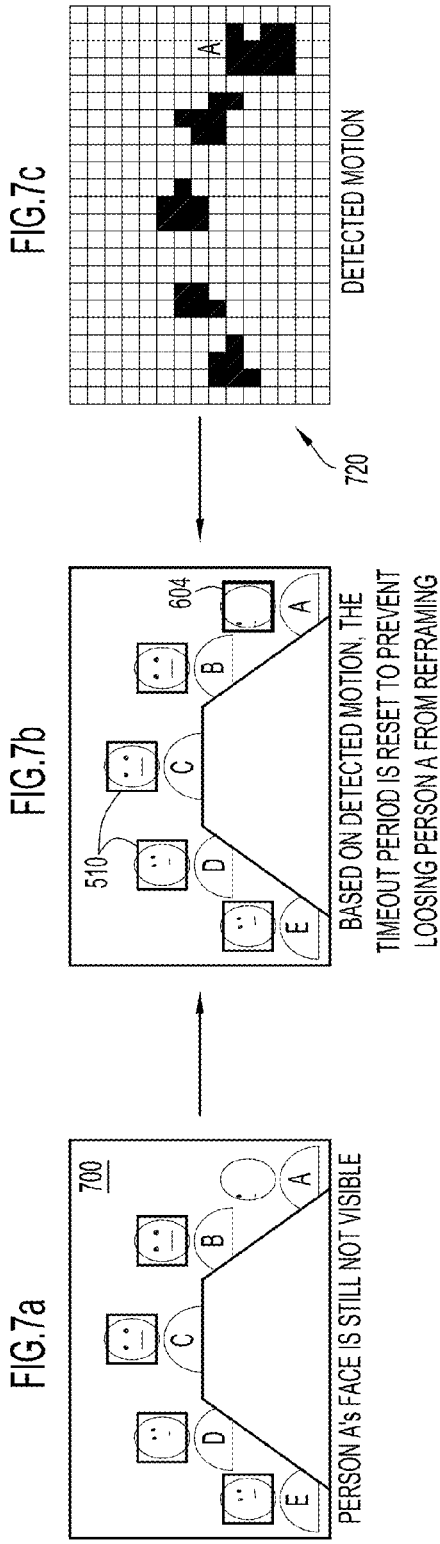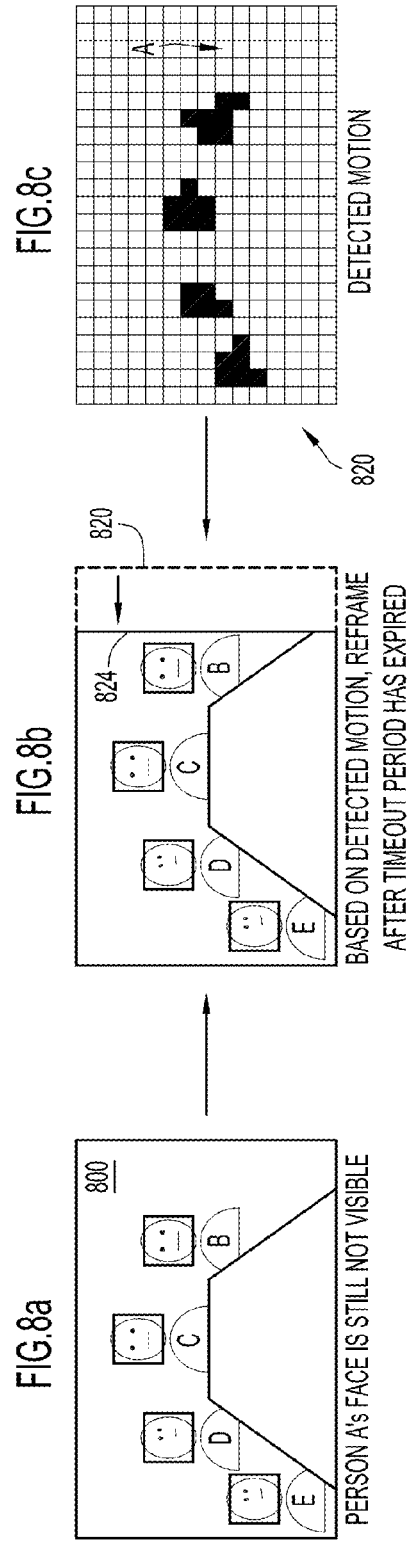

USE OF FACE AND MOTION DETECTION FOR BEST VIEW FRAMING IN VIDEO CONFERENCE ENDPOINT

TECHNICAL FIELD

The present disclosure relates to video framing in a video conference system.

BACKGROUND

A video conference system includes an endpoint that captures video of participants seated in a room, for example, and then transmits the video to a conference server or to another endpoint. The video conference endpoint may detect participant faces in the captured video to compose periodically updated camera framing, i.e., to frame the detected faces in the captured video.

Participants tend to move during a long teleconference session. For example, a participant may turn away from a camera that captures the video for a few seconds while remaining seated, leave the room, or move to another seat. In each case, the endpoint may be unable to detect the face that was originally detected prior to the movement, and assume that the lost detection means the participant has left the room.

BRIEF DESCRIPTION OF THE DRAWINGS

FIGS. 5a, 5b, and 5c are illustrations respectively of a view of a scene (also referred to simply as a "view") captured by the video conference endpoint at a first time, detected faces (indicated as being enclosed in boxes) corresponding to the captured view, and independently detected motion corresponding to the captured view, according to an example embodiment.

FIGS. 6a, 6b, and 6c are illustrations respectively of a view (indicating detected faces) captured by the video conference endpoint at a second time after the first time, detected faces corresponding to the captured view, and independently detected motion corresponding to the captured view, according to an example embodiment.

FIGS. 7a, 7b, and 7c are illustrations respectively of a view (also indicating detected faces) captured by the video conference endpoint at a third time after the second time, detected faces corresponding to the captured view, and independently detected motion corresponding to the captured view, according to an example embodiment.

FIGS. 8a, 8b, and 8c are illustrations respectively of a view (also indicating detected faces) captured by the video conference endpoint at a fourth time after the third time and after a participant has left the room, detected faces corresponding to the captured view in a reframed view, and independently detected motion corresponding to the captured view, according to an example embodiment.

DESCRIPTION OF EXAMPLE EMBODIMENTS

Overview

Techniques presented herein relate to best view framing of participants by a video conference endpoint using independent face and motion detection techniques. Motion detection is used to possibly hold-off view/camera reframing in a case where a participant may have looked away from a camera of a video conference endpoint. The video conference endpoint detects faces at associated face positions in video frames capturing a scene. The video conference endpoint frames the video frames to a view of the scene encompassing all of the detected faces. At some point, a previously detected face is no longer detected. In response to no longer detecting the previously detected face, the video conference endpoint starts a timeout period and independently of the detection of faces, detects motion across the view. The video conference endpoint determines if any (independently) detected motion (i) coincides with the face position of the previously detected face (that is no longer detected), and (ii) occurs before the timeout period expires. If conditions (i) and (ii) are met, the video conference endpoint restarts the timeout period and repeats the independently detecting motion and the determining of conditions (i) and (ii). Otherwise, the video conference endpoint reframes the view to encompass the remaining detected faces (in the absence of the face that is no longer detected).

Example Embodiments

As explained above, during a video conference session, participants inevitably tend to move. For example, a participant may turn away from a camera that captures the video for a few seconds while remaining seated, leave the room, or move to another seat. In each case, the video conference endpoint may be unable to detect the face that was originally detected prior to the movement, and assume that the lost detection means the participant has left the room.

Based on this assumption, the video conference endpoint performs video reframing (e.g., zooms the camera in or out). While such reframing may be appropriate if the participant has actually left or moved elsewhere in the room, it may not be appropriate if the participant has simply looked away from the camera for a few moments. Unnecessarily reframing the camera each time a participant simply turns away disrupts the video experience at the offsite locations and should be avoided.

Figure 1:
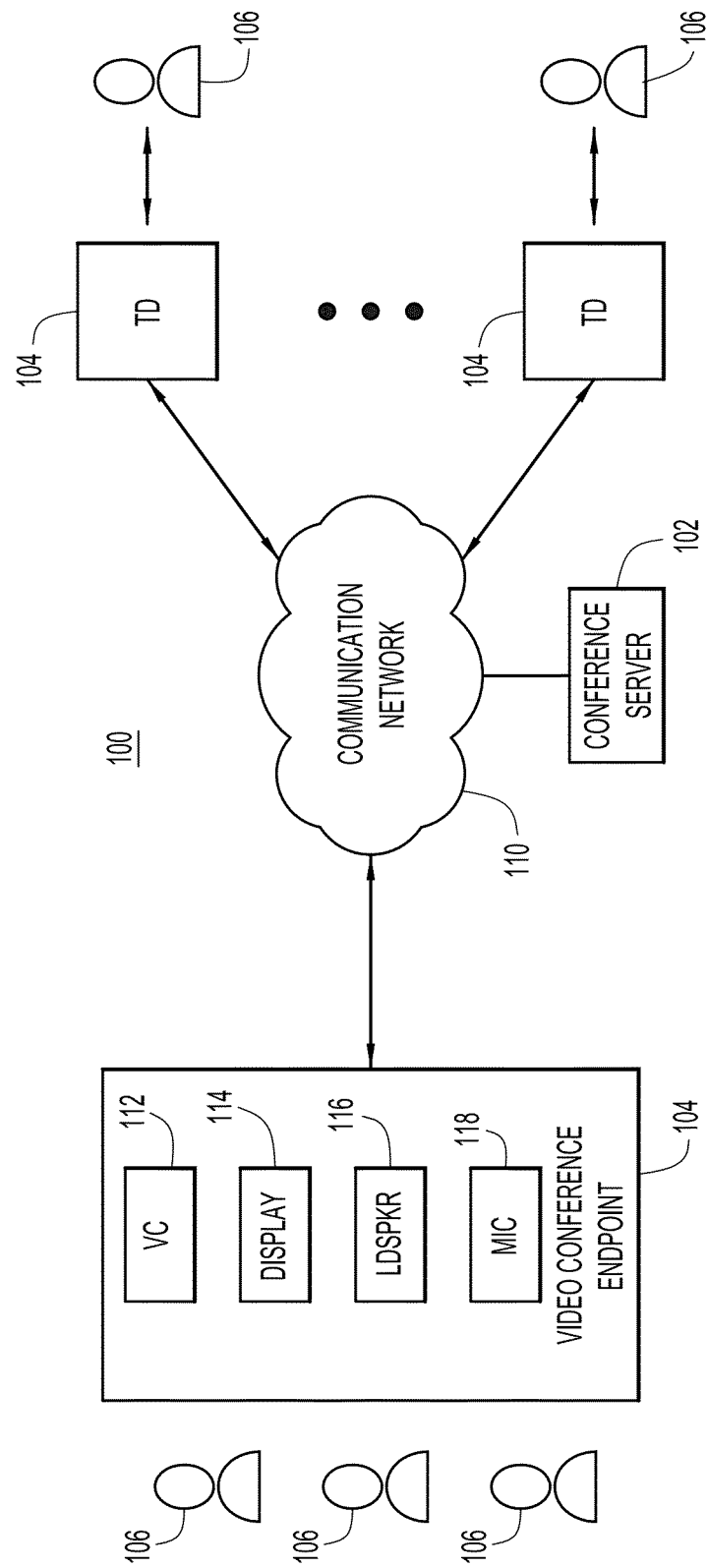
FIG. 1 is a block diagram of a video conference (e.g., teleconference) environment in which best frame viewing techniques may be implemented, according to an example embodiment.

With reference to FIG. 1, there is depicted a block diagram of a video conference (e.g., teleconference) environment 100 in which techniques to use independent motion detection for best view framing may be implemented. Video conference environment 100 includes video conference endpoints 104 operated by local users/participants 106 and configured to establish audio-visual teleconference collaboration sessions with each other over a communication network 110. Communication network 110 may include one or more wide area networks (WANs), such as the Internet, and one or more local area networks (LANs). A conference server 102 may also be deployed to coordinate the routing of audio-video streams among the video conference endpoints.

Each video conference endpoint 104 may include a video camera (VC) 112, a video display 114, a loudspeaker (LDSPKR) 116, and one or more microphones (MIC) 118. Endpoints 104 may be wired or wireless communication devices equipped with the aforementioned components, such as, but not limited to laptop and tablet computers, smartphones, etc.

In a transmit direction, endpoints 104 capture audio/video from their local participants 106 with microphones 118/VC 112, encode the captured audio/video into data packets, and transmit the data packets to other endpoints or to the conference server 102. In a receive direction, endpoints 104 decode audio/video from data packets received from the conference server 102 or other endpoints and present the audio/video to their local participants 106 via loudspeaker 116/display 114.

Figure 2:
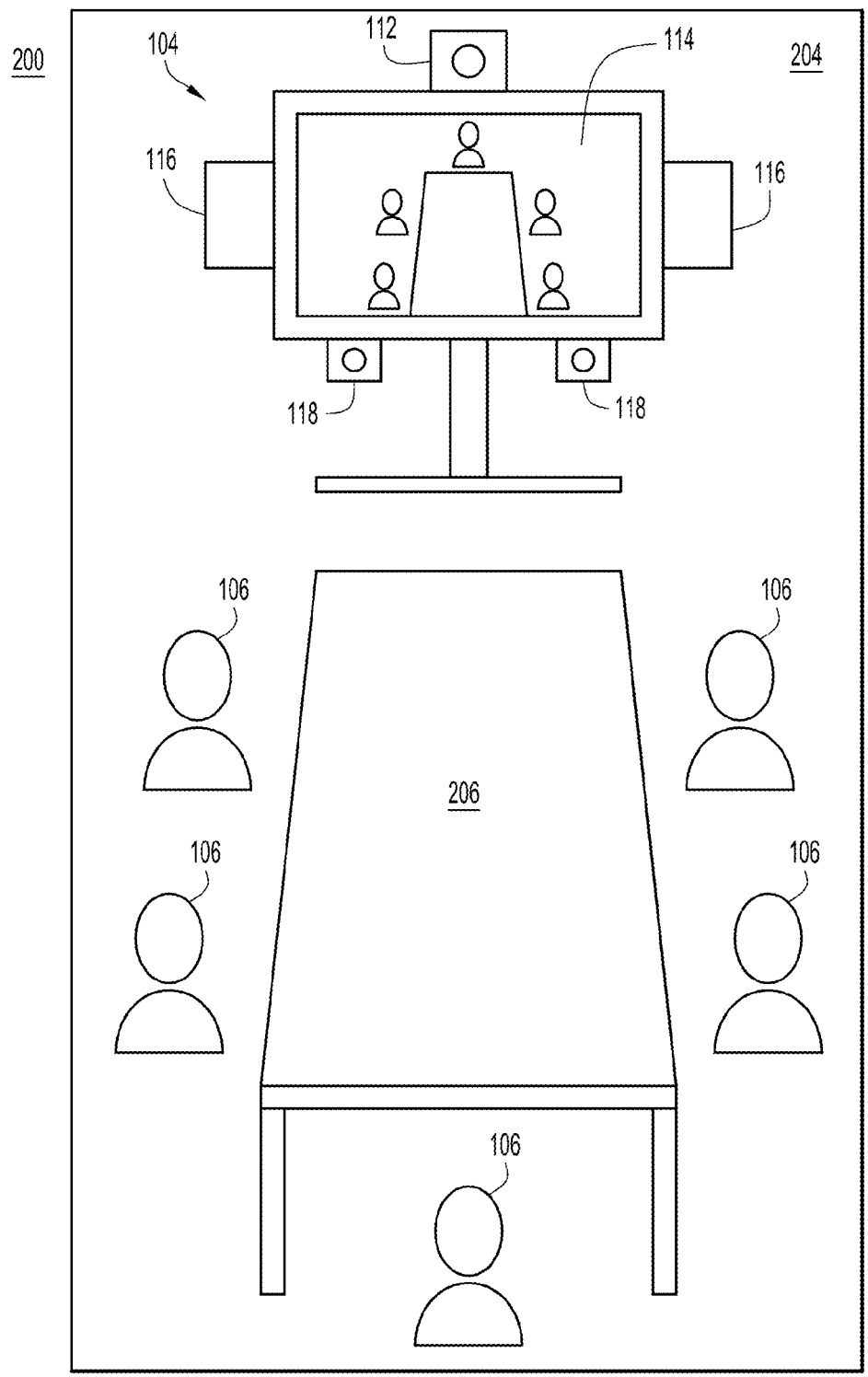
FIG. 2 is an illustration of video conference endpoint deployed in a conference room and configured to perform best frame viewing, according to an example embodiment.

Referring now to FIG. 2, there is depicted an illustration of video conference endpoint 104 deployed in a conference room 204 (depicted simplistically as an outline in FIG. 2). Video camera 112 captures a video of a scene that includes multiple participants 106 facing the camera seated around a table 206 in room 204. Camera 112 typically includes pan, tilt, and zoom (PTZ) features that may be implemented mechanically and/or digitally. Video conference endpoint 104 uses a face detection technique to detect faces and associated positions thereof of participants 106 captured in the video. Video conference endpoint 104 pans, tilts, and zooms video camera 112 (in the mechanical or digital domain) as necessary to frame a best view of the scene encompassing all of the detected faces. In one embodiment, face detection and camera PTZ control for framing may be implemented at local video conference endpoint 104. In other embodiments, face detection and/or camera PTZ control may be implemented at the remote/receiving video conference endpoint, or even in the cloud (e.g., at conference server 102). Due to participant movement, video conference endpoint 104 may detect that one of the (previously) detected faces is no longer detectable. If this is the case, endpoint 104 starts a timeout period that expires after a predetermined period (e.g., 10 seconds). During at least this period, endpoint 104 will hold-off reframing the best view. Video conference endpoint 104 uses a motion detection technique that operates independently of the face detection technique to detect motion, if any, across the best view. Video conference endpoint 104 determines if any detected motion (i) coincides with the position of the previously detected face that is no longer detectable, and (ii) occurs before the timeout period expires. If both conditions (i) and (ii) are met, system 104 restarts the timeout period and repeats the detecting motion and determining if conditions (i) and (ii) are met. Otherwise, system 104 reframes the video to a new best view encompassing all of remaining detected faces, but only after the timeout period has expired.

The result of this is that video conference endpoint 104 does not automatically and immediately reframe the camera when a detected face is lost (i.e., the face detection is lost). Rather, it waits at least one timeout period of, for example, 10 seconds, during which time the detected face may be re-detected (i.e., may return). Also, video conference endpoint 104 decouples face detection from motion detection, i.e., the two detection techniques are performed independently of each other. As a result, different combinations of face detection and motion detection techniques may be used at any give time to effect best results.

Figure 3:
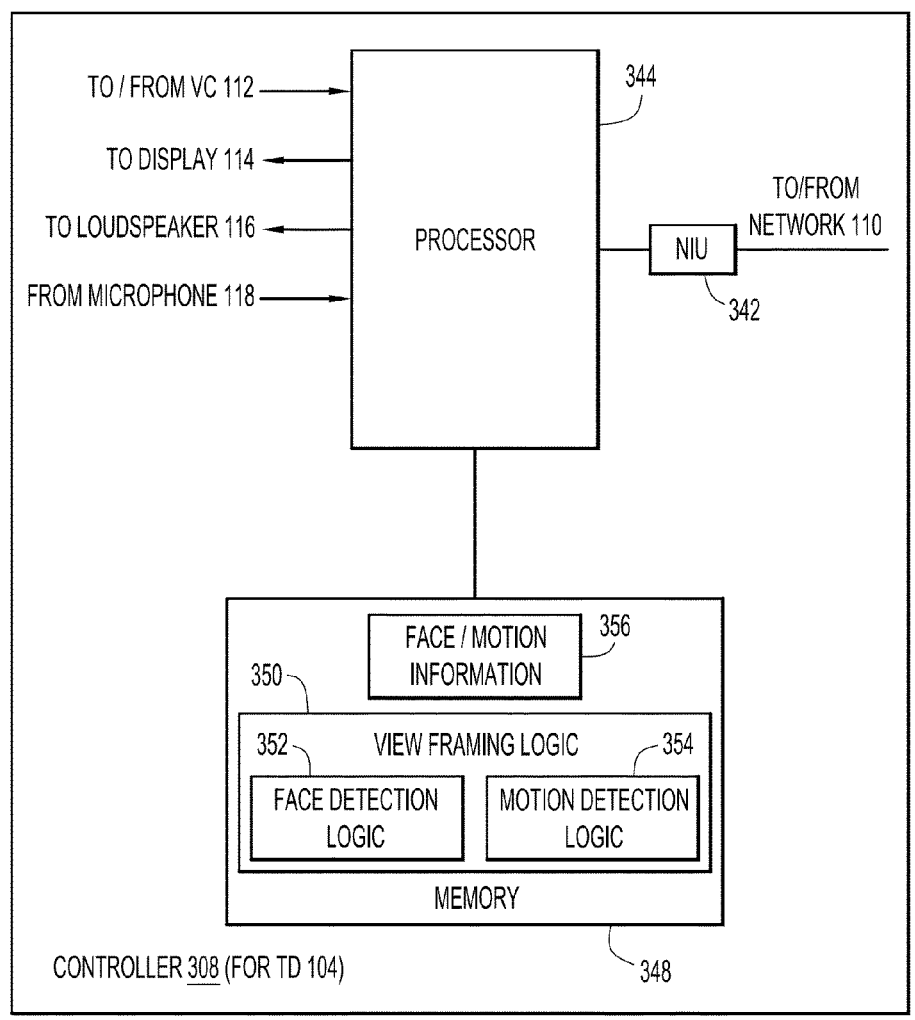
FIG. 3 is block diagram of a controller of the video conference endpoint configured to perform the best frame viewing, according to an example embodiment.

Reference is now made to FIG. 3, which shows an example block diagram of a controller 308 of video conference endpoint 104 configured to perform best view video framing using independent motion and face detection techniques. There are numerous possible configurations for controller 308 and FIG. 3 is meant to be an example. Controller 308 includes a network interface unit 342, a processor 344, and memory 348. The network interface (I/F) unit (NIU) 342 is, for example, an Ethernet card or other interface device that allows the controller 308 to communicate over communication network 110. Network I/F unit 342 may include wired and/or wireless connection capability.

Processor 344 may include a collection of microcontrollers and/or microprocessors, for example, each configured to execute respective software instructions stored in the memory 348. The collection of microcontrollers may include, for example: a video controller to receive, send, and process video signals related to display 112 and video camera 112; an audio processor to receive, send, and process audio signals related to loudspeaker 116 and microphone microphones 118; and a high-level controller to provide overall control. Portions of memory 348 (and the instruction therein) may be integrated with processor 344. As used herein, the terms "audio" and "sound" are synonymous and interchangeably. Processor 344 may send pan, tilt, and zoom commands to video camera 112, which is responsive to the commands as would be appreciated by one of ordinary skill in the relevant arts. As mentioned above, PTZ control may be implemented in the local video conference endpoint, the conference server, or in the receiving video conference endpoint.

The memory 348 may comprise read only memory (ROM), random access memory (RAM), magnetic disk storage media devices, optical storage media devices, flash memory devices, electrical, optical, or other physical/tangible (e.g., non-transitory) memory storage devices. Thus, in general, the memory 348 may comprise one or more computer readable storage media (e.g., a memory device) encoded with software comprising computer executable instructions and when the software is executed (by the processor 344) it is operable to perform the operations described herein. For example, the memory 348 stores or is encoded with instructions for View Framing logic 350 to perform operations described herein for best view framing. View framing logic 350 also includes Face Detection logic 352 to detect faces, and Motion Detection logic 354 to detect motion independently of the Face Detection logic.

In addition, memory 348 stores face/motion information 356 used and generated by logic 350, 352, and 354, including information associated with detected faces (e.g., positions, angular offsets from a reference axis, and confidence areas—described below), and information associated with detected motion.

Figure 4:
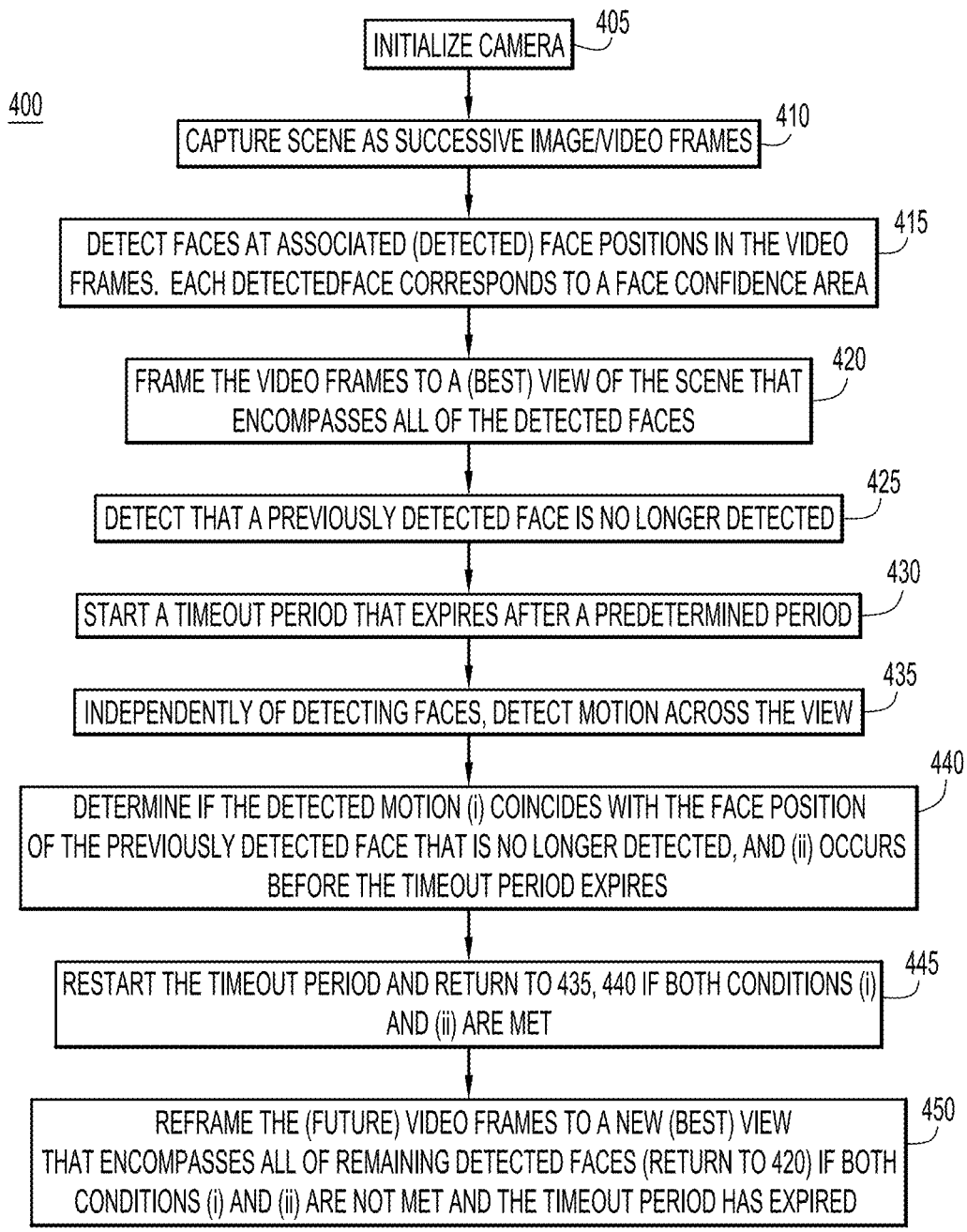
FIG. 4 is a flowchart of an example method of best view video framing using independent motion and face detection techniques, according to an example embodiment.

With reference to FIG. 4, there is depicted a flowchart of an example method 400 of best view video framing using independent motion and face detection techniques performed by controller 308 (View Framing logic 350) in telepresence system 104.

At 405, controller 308 initializes camera 112, i.e., commands the camera to initial pan, tilt, and zoom settings to capture video of an expanded scene of room 206.

At 410, camera 112 captures successive video frames of the expanded scene. Each video frame comprises an array of pixels. Each of the pixels has associated Red, Green, Blue (RGB) pixel values, for example.

At 415, controller 308 (using Face Detection Logic 352) detects faces and associated face positions of participants 106 in the captured scene based on an analysis of the video frames, and stores information in memory associated with the detected faces in memory 348, e.g., the number of times (instances) when the faces were detected and associated positions thereof in the video frames. Controller 308 may use any now known or hereafter developed technique to detect faces. Typically, such techniques detect facial features, such as eyes, nose, mouth, hair, etc. Controller 308 validates detected faces and uses the validated detected faces for subsequent operations described below. In an embodiment, controller 308 validates each detected face if the face positions thereof detected in successive video frames predominantly fall within a confidence or correlation area associated with that face. In an embodiment, the confidence area may be a rectangular area (a box) initially set to a predetermined size at 405.

At 420, controller 308 pans, tilts, and zooms camera 112 as necessary to frame the video frames to a best view of the captured scene that encompasses all of the detected faces. The best view is a view centered on the group of participants 106 and in which the degree of camera zoom establishes an outer boundary around the group. The outer boundary is fitted relatively tightly to the group but allows room to show, e.g., the face and an upper body of each of the participants with extra margin to accommodate participant movement.

At 425, controller 308 may detect that one of the previously detected faces in the video frames has become undetectable (i.e., is no longer detected), possibly due to participant movement. For example, the participant may look away from the camera or actually move sufficiently that associated face positions fall outside of the confidence area established for that face. In response to this loss of face detection, controller 308 performs next operations 430-450.

At 430, controller 308 starts a predetermined timeout period. For example, controller 308 starts a timer (i.e., a face detection timer) that expires after the predetermined timeout period. The timeout period may be a time within a range of 3-60 seconds that spans many future video frames. In another example, controller 308 may count a predetermined number of successive video frames that correspond to, i.e., span, the timeout period. In other embodiments, face detections may be stored for periods much longer than 60 seconds. In such cases, the timeout period may be extended to days, weeks, or even years.

At 435, using a motion detection technique (implemented using Motion Detection logic 354) that is independent of the face detection technique used to detect faces in operation 425 and independent of the detected face results generated in operation 425 (e.g., face positions, etc.), controller 308 detects motion across the entire view framed at 420 in each of the video frames.

In one embodiment, controller 308 performs motion detection operation 435 as a background operation in parallel with operations 415-430 of method 400. In another embodiment, controller 308 performs operation 435 in response to detecting that one of the faces is no longer detectable.

Any known or hereafter developed technique to detect motion in video frames may be used. In one embodiment, to detect motion, controller 308 partitions each video frame into an array of separate spatial regions that collectively cover an entirety of the video frame (see, e.g., FIGS. 5c, 6c, and 7c, described below). Each spatial region comprises an array of pixel groups, where each pixel group includes an arrangement of Red, Green, Blue pixels, each of which having a corresponding pixel value. An aggregate pixel value is then computed for each spatial region in each video frame based on the RGB values of the pixel groups in that region. For example, the aggregate pixel value may be a summation or, alternatively, average across all of the pixel values in the region. A difference is computed between aggregate pixel values of corresponding (spatially coincidental) spatial regions in successive video frames, i.e., the difference between aggregate pixel values of spatial regions in successive video frames that corresponding to the same spatial region of the captured scene/view. Detected motion is declared in a spatial region of the captured scene/view if the computed difference exceeds a threshold value indicative of motion. Such a spatial region is referred to as an "active" region.

At 440, controller 308 determines if any motion detected across the scene/view meets the following two conditions:

a. whether the detected motion coincides with the face position of the previously detected face that is no longer detectable. For example, whether any active regions coincide with, e.g., overlap with, the confidence area associated with the face position; and b. whether the detected motion occurs during the timeout period, i.e., before the timeout period expires.

At 445, if both conditions (a) and (b) are met, process flow returns to 435, 440, where conditions (a) and (b) are tested again while motion continues to be detected. On the other hand, if both conditions (a) and (b) are not met, e.g., either the detected motion does not coincide positionally with the face position or the timeout period has expired (or both), then flow proceeds to 450.

At 450, controller 308 reframes the (subsequent) video frames to a new best view that encompasses all of the remaining detected faces after the timeout period expires.

Having described the general method 400 of best view framing using independent face and motion detection techniques above, various example face and motion detection scenarios are now described. The sets of FIGS. 5a-5c, 6a-6c, 7a-7c, and 8a-8c described below represent sets of illustrations corresponding to first, second, third, and fourth successive times, as will become apparent.

With reference to FIG. 5a, there is depicted a view 500 of a scene/view of participants A-E (participants 106) seated about table 204 captured by camera 112. In FIG. 5b, there is an illustration of detected faces corresponding to participants 106 from view 500. Each detected face is indicated as a confidence area (box) 510 that encapsulates the associated detected face.

Turning to FIG. 5c, there is an illustration of detected motion 520 (i.e., a detected motion map) for the associated view 500 that is derived independently of detected faces 510. In the example of FIG. 5c, view 500 has been divided into an array of separate rectangular regions 522. Each of regions 522 includes an array of pixel groups 524, where each pixel group includes R, G, and B pixels. Shaded regions indicate active regions, i.e., regions in which motion has been detected.

In FIG. 5c, detected motion 520 includes collections A-E of active regions. As depicted in FIG. 5c, collections A-E of active regions each coincides positionally with a corresponding one of participants A-E and therefore represents the motion of that participant (once a detected face position has been correlated with the corresponding collection, for example, in operations 440). Collection A is the largest collection of active regions, which indicates that participant A has moved (moved her head) more than the other participants during a time period over which the motion was detected. In the example, collection A includes 12 active regions, while collection E includes only 6 active regions.

With reference to FIG. 6a, there is a next view 600 captured later in time than view 500, in which participant A has turned her face toward participant B and thus away from camera 112. As a result of this motion, the face of participant A is no longer detectable, i.e., that face becomes a previously detected face that is no longer detected.

In FIG. 6b, there is an illustration of detected faces 510 corresponding to view 600 and a highlighted confidence area 604 around the now undetectable face of participant A. The highlighting indicates that the timeout period has been started, but has not yet expired. Since the timeout period has not expired, system 104 holds-off from reframing/resizing view 600.

Referring to FIG. 6c, there is an illustration of detected motion 620 corresponding to view 600. Collection A in detected motion 620 indicates the movement of participant A's face in view 600.

Turning now to FIG. 7a, there is depicted a next view 700 captured later in time than view 600, in which participant A is still turned toward participant B and away from camera 112. Thus, the face of participant A is still undetectable. The time at which view 700 is captured is before the expiry of the timeout period started in association with the loss of the detected face in FIG. 6b.

FIGS. 7b and 7c show illustrations of the detected faces (FIG. 7b) and detected motion 720 (FIG. 7c) corresponding to view 700. In FIG. 7b, confidence area 604 is still highlighted because the timeout period started in association with the loss of the detected face in FIG. 6b has been restarted (and thus is still not expired) because the detected motion of collection A (depicted in FIG. 7c) coincides with participant's A's previously detected face position (from FIG. 5b) and occurs before the timeout period.

Turning to FIG. 8a, there is a next view 800 captured later in time than view 700, in which participant A is no longer visible to camera 112. In FIG. 8b, there is an illustration of detected faces corresponding to view 800. The face of participant A is no longer detectable. Further, with reference to FIG. 8c, detected motion 820 indicates there are no active regions (i.e., no motion) that coincides with the face of participant A. As long as the timeout period has not yet expired, controller 308 holds-off from reframing view 800; however, as soon as the timeout period expires, the controller 308 reframes view 800, e.g., moves right-margin 822 to the left to a new margin 824, to encompass all of the remaining detected faces (in the absence of participant A's face).

In summary, in one form, a method is provided comprising: detecting faces at associated face positions in video frames capturing a scene; framing the video frames to a view of the scene encompassing all of the detected faces; detecting that a previously detected face is no longer detected and, in response: starting a timeout period; independently of the detecting faces, detecting motion across the view; determining if the detected motion (i) coincides with the face position of the previously detected face that is no longer detected, and (ii) occurs before the timeout period expires; and if it is determined that the detected motion coincides with the face position and occurs before the timeout period expires, restarting the timeout period and repeating the independently detecting motion and the determining.

In summary, in another form, an apparatus is provided comprising: a network interface unit configured to communicate over a network; and a processor coupled to the network interface unit, and configured to: detect faces at associated face positions in video frames capturing a scene; frame the video frames to a view of the scene encompassing all of the detected faces; detect that a previously detected face is no longer detected and, in response: start a timeout period; independently of the detecting faces, detect motion across the view; determine if the detected motion (i) coincides with the face position of the previously detected face that is no longer detected, and (ii) occurs before the timeout period expires; and if it is determined that the detected motion coincides with the face position and occurs before the timeout period expires, restart the timeout period and repeat the operations to independently detect motion and determine if the detected motion coincides with the face position and occurs before the timeout period expires.

In summary, in yet another form, a processor readable medium is provided. The processor readable medium stores instructions that, when executed by a processor, cause the processor to: detect faces at associated face positions in video frames capturing a scene; frame the video frames to a view of the scene encompassing all of the detected faces; detect that a previously detected face is no longer detected and, in response: start a timeout period; independently of the detecting faces, detect motion across the view; determine if the detected motion (i) coincides with the face position of the previously detected face that is no longer detected, and (ii) occurs before the timeout period expires; and if it is determined that the detected motion coincides with the face position and occurs before the timeout period expires, restart the timeout period and repeating the operations to independently detect motion and determine if the detected motion coincides with the face position and occurs before the timeout period expires.

The above description is intended by way of example only. Various modifications and structural changes may be made therein without departing from the scope of the concepts described herein and within the scope and range of equivalents of the claims.

What is claimed is:

1. A method comprising:
    detecting faces at associated face positions in video frames capturing a scene;
    framing the video frames to a view of the scene encompassing all of the detected faces;
    detecting that a previously detected face is no longer detected and, in response:
        starting a timeout period;
        independently of the detecting faces, detecting motion across the view;
        determining if the detected motion (i) coincides with the face position of the previously detected face that is no longer detected, and (ii) occurs before the timeout period expires; and
        if it is determined that the detected motion coincides with the face position and occurs before the timeout period expires, restarting the timeout period and repeating the independently detecting motion and the determining.

2. The method of claim 1, further comprising, in response to the detecting that a previously detected face is no longer detected: if it is determined that the detected motion does not (i) coincide with the face position and (ii) occur before the timeout period expires, reframing the video frames to a new view encompassing all remaining detected faces after the timeout period expires.

3. The method of claim 2, wherein the detecting motion includes:
    partitioning the view into separate spatial regions that cover the view;
    detecting motion in each spatial region independently of the detecting faces based on successive video frames; and
    declaring the spatial region active if motion is detected therein.

4. The method of claim 3, wherein the determining if the detected motion coincides includes determining if at least one active region overlaps the face position of the previously detected face that is no longer detected.

5. The method of claim 4, wherein each video frame comprises an array of pixels having corresponding pixel values, and the detecting motion in each spatial region includes:
    computing a difference between the pixel values corresponding to that spatial region in successive video frames; and declaring the spatial region active if the difference exceeds a threshold value indicative of motion.

6. The method of claim 1, further comprising:
capturing the scene with a video camera that produces the video frames; and
wherein the framing includes panning, tilting, and zooming the video camera so that all of the detected faces are within an outer boundary of each video frame.

7. The method of claim 1, wherein the timeout period is greater than or equal to 3 seconds.

8. The method of claim 1, wherein the independently detecting motion includes detecting motion without reference to information associated with detected face positions.

9. An apparatus comprising:
a network interface unit configured to communicate over a network; and
a processor coupled to the network interface unit, and configured to:
detect faces at associated face positions in video frames capturing a scene;
frame the video frames to a view of the scene encompassing all of the detected faces;
detect that a previously detected face is no longer detected and, in response:
start a timeout period;
independently of the detecting faces, detect motion across the view;
determine if the detected motion (i) coincides with the face position of the previously detected face that is no longer detected, and (ii) occurs before the timeout period expires; and
if it is determined that the detected motion coincides with the face position and occurs before the timeout period expires, restart the timeout period and repeat the operations to independently detect motion and determine if the detected motion coincides with the face position and occurs before the timeout period expires.

10. The apparatus of claim 9, further comprising, in response to the detecting that a previously detected face is no longer detected: if it is determined that the detected motion does not (i) coincide with the face position and (ii) occur before the timeout period expires, reframe the video frames to a new view encompassing all remaining detected faces after the timeout period expires.

11. The apparatus of claim 10, wherein the processor is configured to detect motion by:
partitioning the view into separate spatial regions that cover the view;
detect motion in each spatial region independently of the detecting faces based on successive video frames; and
declare the spatial region active if motion is detected therein.

12. The apparatus of claim 11, wherein the processor is configured to determine if the detected motion coincides by determining if at least one active region overlaps the face position of the previously detected face that is no longer detected.

13. The apparatus of claim 12, wherein each video frame comprises an array of pixels having corresponding pixel values, and the processor is configured to detect motion in each spatial region by:
computing a difference between the pixel values corresponding to that spatial region in successive video frames; and
declaring the spatial region active if the difference exceeds a threshold value indicative of motion.

14. The apparatus of claim 9, further comprising a video camera to capture the scene and produce the video frames representative of the scene, wherein the processor is further configured to cause the video camera to pan, tilt, and zoom so that all of the detected faces are within an outer boundary of each video frame.

15. The apparatus of claim 9, wherein the processor is configured to independently detect motion by detecting motion without reference to information associated with detected face positions.

16. A non-transitory processor readable medium storing instructions that, when executed by a processor, cause the processor to:
detect faces at associated face positions in video frames capturing a scene;
frame the video frames to a view of the scene encompassing all of the detected faces;
detect that a previously detected face is no longer detected and, in response:
start a timeout period;
independently of the detecting faces, detect motion across the view;
determine if the detected motion (i) coincides with the face position of the previously detected face that is no longer detected, and (ii) occurs before the timeout period expires; and
if it is determined that the detected motion coincides with the face position and occurs before the timeout period expires, restart the timeout period and repeating the operations to independently detect motion and determine if the detected motion coincides with the face position and occurs before the timeout period expires.

17. The non-transitory processor readable medium of claim 16, further comprising instructions to cause the processor to, in response to the detecting that a previously detected face is no longer detected: if it is determined that the detected motion does not (i) coincide with the face position and (ii) occur before the timeout period expires, reframe the video frames to a new view encompassing all remaining detected faces after the timeout period expires.

18. The non-transitory processor readable medium of claim 17, wherein the instructions to cause the processor to detect motion include instructions to cause the processor to:
partition the view into separate spatial regions that cover the view;
detect motion in each spatial region independently of the detecting faces based on successive video frames; and
declare the spatial region active if motion is detected therein.

19. The non-transitory processor readable medium of claim 18, wherein the instruction to cause the processor to determine if the detected motion coincides includes instruction to cause the processor to determine if at least one active region overlaps the face position of the previously detected face that is no longer detected.

20. The non-transitory processor readable medium of claim 19, wherein each video frame comprises an array of pixels having corresponding pixel values, and the instructions to cause the processor to detect motion in each spatial region include instructions to cause the processor to:
compute a difference between the pixel values corresponding to that spatial region in successive video frames; and
declare the spatial region active if the difference exceeds a threshold value indicative of motion.

21. The non-transitory processor readable medium of claim 16, further comprising instruction to cause the processor to:
- capturing the scene with a video camera that produces the video frames; and
- pan, tilt, and zoom a video camera, configured to capture the scene to produce the video frames, so that all of the detected faces are within an outer boundary of each video frame.

22. The non-transitory processor readable medium of claim 16, wherein the timeout period is greater than or equal to 3 seconds.

23. The non-transitory processor readable medium of claim 16, wherein the instruction to cause the processor to independently detect motion include instructions to cause the processor to detect motion without reference to information associated with detected face positions.

* * * * *